(12) United States Patent
Kapoor (10) Patent No.: US 9,559,365 B1
(45) Date of Patent: Jan. 31, 2017

(54) OXIDATION PROCESS FOR INTERCONNECTS AND END PLATES USING NITROUS OXIDE

(71) Applicant: Bloom Energy Corporation, Sunnyvale, CA (US)

(72) Inventor: Sanjiv Kapoor, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 462 days.

(21) Appl. No.: 13/969,803

(22) Filed: Aug. 19, 2013

Related U.S. Application Data

(60) Provisional application No. 61/700,194, filed on Sep. 12, 2012.

(51) Int. Cl.
   *C23C 8/16* (2006.01)
   *H01M 8/0202* (2016.01)
   *H01M 8/02* (2016.01)
   *H01M 8/10* (2016.01)

(52) U.S. Cl.
   CPC .................. *H01M 8/0202* (2013.01)

(58) Field of Classification Search
   CPC ............ H01M 8/0202; C23C 8/16; C23C 8/18
   See application file for complete search history.

(56) References Cited

U.S. PATENT DOCUMENTS

| 2008/0199738 A1* | 8/2008 | Perry | H01M 8/026 |
| | | | 429/444 |
| 2012/0070957 A1* | 3/2012 | Mallick | H01L 21/02126 |
| | | | 438/422 |
| 2012/0252207 A1* | 10/2012 | Lei | H01L 21/76885 |
| | | | 438/653 |

OTHER PUBLICATIONS

Kapteijn et al. "Heterogeneous Catalytic Decomposition of Nitrous Oxide", Applied Catalysis B: Environmental 9 (1996) pp. 25-64 (Kapteijn).*

* cited by examiner

*Primary Examiner* — Lois Zheng
(74) *Attorney, Agent, or Firm* — The Marbury Law Group PLLC (57) ABSTRACT

Embodiments include methods and systems for oxidizing an interconnect for a fuel cell stack that include generating atomic oxygen, and forming an oxide layer on exposed surfaces of at least one interconnect using the atomic oxygen. In various embodiments, the atomic oxygen may be generated by thermally decomposing nitrous oxide gas into molecular nitrogen and atomic oxygen. In further embodiments, the atomic oxygen may be generated by catalytically decomposing nitrous oxide gas into molecular nitrogen and atomic oxygen. In further embodiments, the atomic oxygen may be generated using microwave discharge. In the various embodiments, the oxidation of the interconnect may be a controlled oxidation that is performed prior to incorporating the interconnect into a fuel cell stack.

26 Claims, 10 Drawing Sheets

OXIDATION PROCESS FOR INTERCONNECTS AND END PLATES USING NITROUS OXIDE

CROSS-REFERENCE TO RELATED APPLICATION

This application claims the benefit of priority to U.S. Provisional Patent Application Ser. No. 61/700,194 entitled "Oxidation Process for Interconnects and End Plates Using Nitrous Oxide" filed Sep. 12, 2012, which is incorporated herein by reference in its entirety.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include methods for oxidizing an interconnect for a fuel cell stack that comprise generating atomic oxygen, and forming an oxide layer on exposed surfaces of at least one interconnect using the atomic oxygen. In various embodiments, the atomic oxygen may be generated by thermally decomposing nitrous oxide gas into molecular nitrogen and atomic oxygen. In further embodiments, the atomic oxygen may be generated by catalytically decomposing nitrous oxide gas into molecular nitrogen and atomic oxygen. In further embodiments, the atomic oxygen may be generated using microwave discharge. In the various embodiments, the oxidation of the interconnect may be a controlled oxidation that is performed prior to incorporating the interconnect into a fuel cell stack.

Further embodiments include systems for oxidizing one or more interconnects for a fuel cell stack using atomic oxygen.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods and systems for performing controlled oxidation of interconnects and end plates for a fuel cell stack using atomic oxygen to form an oxide material on the interconnects and end plates.

Figure 1:
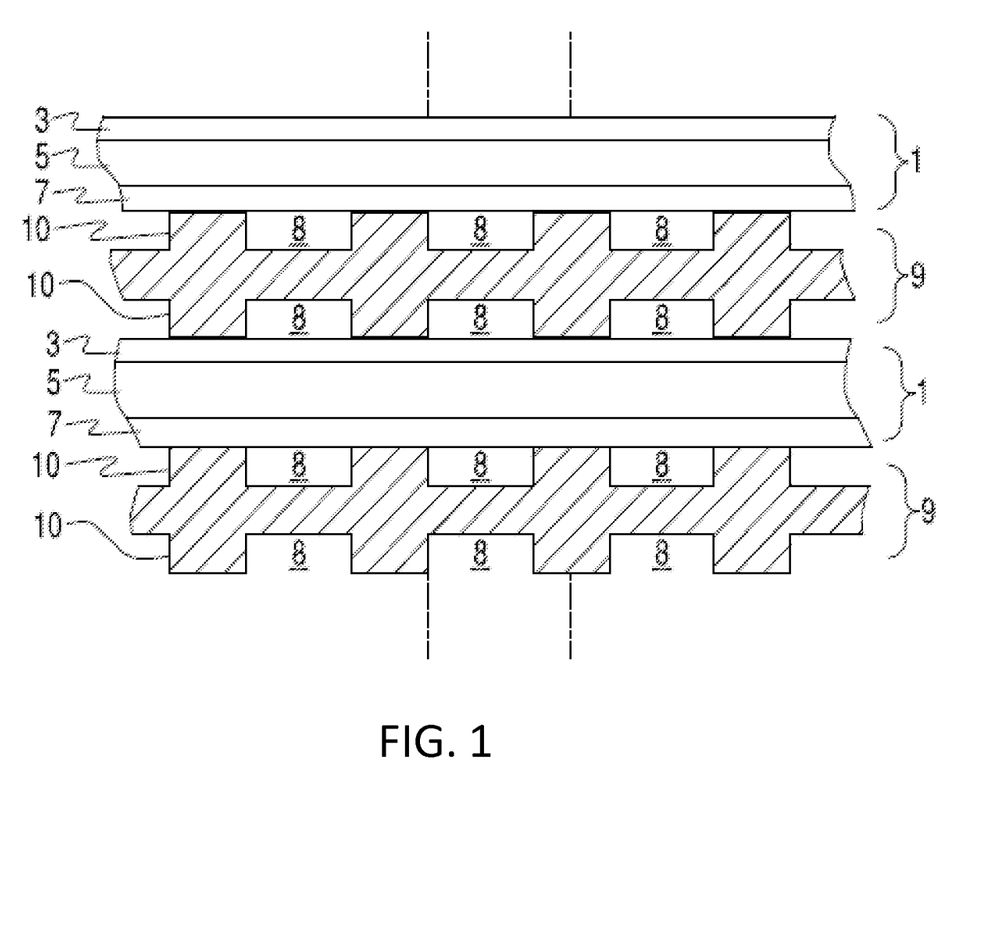
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. An "interconnect" as used herein refers to both a interconnect/gas flow separator between two adjacent fuel cells in a fuel cell stack as well as to an "end plate" located at an end of a fuel cell stack, unless otherwise specified. FIG. 1 shows that the lower SOFC 1 is located between two interconnects 9.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a Cr—Fe powder, which may be a mixture of Cr and Fe powders and/or pre-alloyed Cr—Fe powder, to form a Cr—Fe alloy interconnect in a desired size and shape (e.g., a "net shape" or "near net shape" process). A typical chromium-alloy interconnect may comprise at least about 80% chromium by weight, and preferably more than about 90% chromium, such as about 95% chromium. The interconnect may contain less than about 20% iron by weight, and preferably less than about 10% iron, such as about 4-6% iron (e.g., about 5% iron). The interconnect may contain less than about 2% by weight, such as about zero to 1% of other materials, such as yttrium or yttria, as well as residual or unavoidable impurities.

In example method for fabricating interconnects, blended Cr and Fe elemental powders are pressed in a hydraulic or mechanical press to produce a part having the desired interconnect shape. The Cr and Fe powders are blended with an organic binder and pressed into so-called "green parts" using a conventional powder metallurgy technique. The "green parts" have substantially the same size and shape as the finished interconnect (i.e., "near net shape"). The organic binder in the green parts is removed before the parts are sintered. The organic binder is removed in a debinding process in a furnace (e.g., a continuous furnace) that is operated at atmospheric pressure at a temperature of 400° C. to 800° C. under flow of hydrogen gas. After debinding, the compressed powder Cr—Fe interconnects are sintered at high-temperature (e.g., 900° C. to 1500° C.) to promote interdiffusion of the Cr and Fe.

Damage to the cells in a fuel cell stack can be reduced or prevented by exposing the interconnects to an oxidizing ambient, such as air at high temperature, prior to use of the interconnect in the stack. The high temperature air exposure causes oxide formation and the associated geometric distortion of the interconnects prior to the attachment of the seals and the interconnect to the cells, such as to the electrolyte and/or the electrodes of the cells. The oxidation at least partially fills the pores throughout the thickness of the relatively porous powder pressed and sintered interconnect, causing a slight change in length and width (e.g., 0.1-0.5%) of the interconnect. During subsequent heat-ups, e.g., during use of the stack, less (or negligible) distortion due to oxidation occurs and the stresses on the cells are greatly reduced compared to stacks containing non-preoxidized interconnects.

The oxide (e.g., $Cr_2O_3$) is formed by oxidizing the sintered Cr—Fe interconnects in air or $Ar/O_2$ mixtures. The controlled oxidation is typically performed at high temperature (e.g., 950 to 1100° C.) using the air and/or $Ar/O_2$ mixture as a source of molecular oxygen (e.g., $O_2$) for the oxide formation. The controlled oxidation may be performed at atmospheric pressure using a continuous furnace or in reduced pressure in a vacuum chamber using a batch furnace. However, under these conditions, it has been observed that a competitive reaction results in undesirable (chromium) nitridation of the interconnects. These nitrides can block the pores and inhibit uniform oxide formation throughout the thickness of the interconnect. It is desirable to reduce or eliminate nitrides, such as CrN, from oxidized interconnects, since this may adversely affect the performance of the fuel cell stack.

Figure 2A:
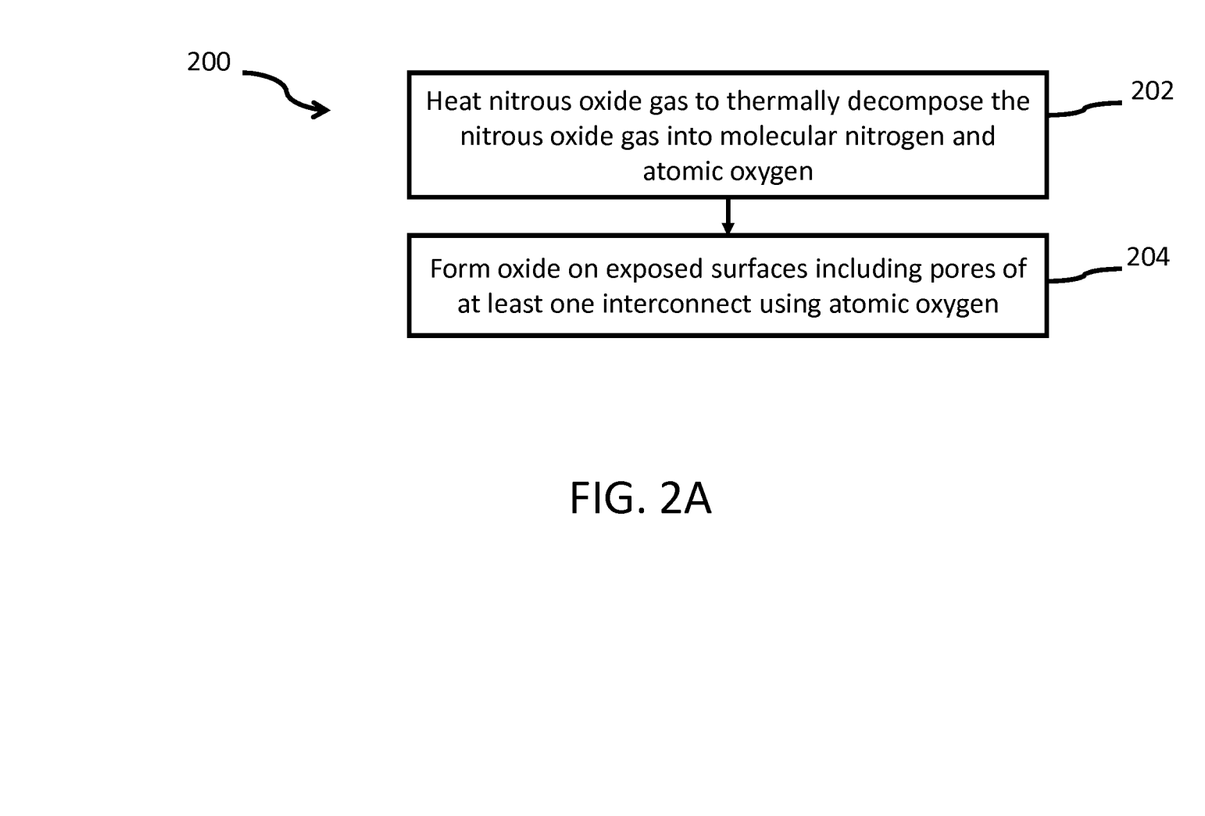
FIG. 2A is a process flow diagram illustrating an embodiment method for performing a controlled oxidation of an interconnect for a fuel cell stack using nitrous oxide as a source of atomic oxygen.

FIG. 2A is a process flow diagram illustrating a method 200 for oxidizing an interconnect, such as interconnect 9 shown in FIG. 1, using nitrous oxide ($N_2O$) as a source gas for the oxide formation. In step 202 of method 200, nitrous oxide gas is heated to a temperature sufficient to cause thermal decomposition of at least a portion of the nitrous oxide into molecular nitrogen and atomic oxygen. In step 204, the thermally decomposed atomic oxygen is used as a source of oxygen to form an oxide material on an interconnect for a fuel cell stack. An oxide material layer may be formed over exposed surfaces of the interconnect, including on the outer surfaces, pores and interconnected pores of the interconnect (e.g., to form surface oxide layers and partially fill the pores in the interconnect). The use of atomic oxygen (e.g., O gas), rather than molecular oxygen (e.g., $O_2$ gas) as is used in current processes, may improve the relative oxidation to nitridation rate, since atomic oxygen has greater activity than molecular oxygen. Thus, undesirable nitride formation on the interconnect may be decreased or inhibited.

In various embodiments, steps 202 and 204 of method 200 may be performed essentially simultaneously, meaning that nitrous oxide may be introduced to the interconnect, such as in a processing chamber (e.g., furnace) at elevated temperature, and the nitrous oxide may be thermally decomposed to produce atomic oxygen for the oxidation of the interconnect in situ. In other embodiments, step 202 may be performed to provide atomic oxygen at a first time and/or location, and the atomic oxygen may be introduced to an interconnect at a second time and/or location to form an oxide material on the interconnect in step 204.

In embodiments, the nitrous oxide may be heated to a temperature of at least about 700° C., which may be sufficient to thermally decompose nitrous oxide into molecular nitrogen and atomic oxygen. The oxidation of the interconnect may be performed at a temperature below 1000° C., such as below 950° C. In embodiments, the oxidation of the interconnect may be performed at a temperature of at least about 700° C., such as 700-950° C. The oxidation may be performed for a period between about 2 and about 48 hours, such as 2-19 hours or 20-48 hours. In this temperature range, which is generally less than the temperatures used for controlled oxidation of interconnects using air, the rate of nitridation of the interconnect is substantially decreased relative to the rate of oxide formation. Thus, the formation of nitrides on the interconnect may be further inhibited.

Figure 2B:
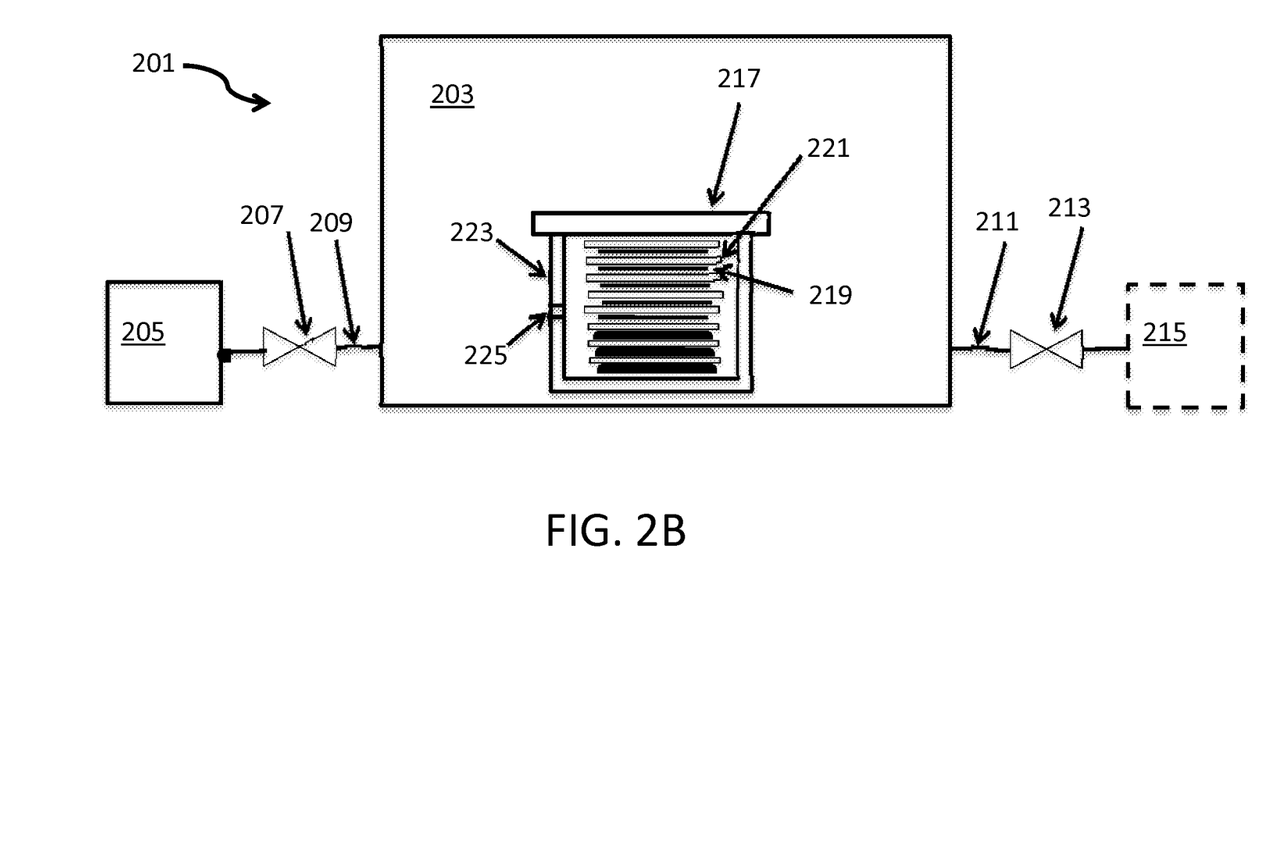
FIG. 2B is a schematic illustration of a system for performing a controlled oxidation of an interconnect using nitrous oxide.

FIG. 2B schematically illustrates an embodiment system 201 for oxidizing interconnects using nitrous oxide ($N_2O$) as a source gas for the oxide formation. The system 201 may include a processing chamber 203 (e.g., a furnace), which may be operable to control the temperature, gas composition and/or pressure within the processing chamber 203. The processing chamber 203 may be in fluid communication with an inlet conduit 209 that is coupled to a source 205 of nitrous oxide gas (e.g., $N_2O$ gas tank). A valve 207 may enable the nitrous oxide gas from the source 205 to be controllably introduced into the processing chamber 203. The processing chamber 203 may also be in fluid communication with an outlet conduit 211. A valve 213 may enable to processing chamber 203 to be controllably evacuated via the outlet conduit 211.

In embodiments, the processing chamber 203 may be a vacuum furnace, and may include an optional pumping apparatus 215, such as a vacuum pump, that is operable to control the pressure within the chamber 203. The processing chamber 203 may be configured to provide a reduced- or sub-atmosphere environment (i.e., below 1 atm, or 760 Torr, pressure). In one embodiment, the processing chamber 203 may be evacuated to a pressure of 0.1 Torr or less, such as $1 \times 10^{-3}$ Torr or less (e.g., $10^{-3}$ to $10^{-6}$), to remove gas, such as air, from the processing chamber 203. One or more pump-purge cycles may be used to remove trace gases from the processing chamber. In one embodiment of a pump-purge cycle, the chamber 203 may be partially filled with an inert gas, such as argon, up to approximately 10 Torr, and then the chamber may be evacuated down to a pressure of approximately 0.1 Torr or less. The chamber 203 may then be filled with a desired gas, such as nitrous oxide gas from source 205, to a desired pressure.

The processing chamber 203 may include heating element(s) that may heat the interior of the chamber 203 and the one or more interconnects 219 to an elevated temperature, such as 700-950° C. At such an elevated temperature, the nitrous oxide gas introduced into the processing chamber 203 from source 205 is thermally decomposed into molecular nitrogen and atomic oxygen. The atomic oxygen is used as a source of oxygen for forming an oxide layer over exposed surfaces of the interconnects 219, including over surfaces of pores and interconnected pores of the interconnects 219.

A plurality of interconnects 219 may be provided within the processing chamber 203. The interconnects 219 may be formed using a powder metallurgy technique (e.g., pressed from Cr and Fe powder), and may be sintered to promote interdiffusion of constituent metal powders (e.g., Cr and Fe), as described above. The plurality of interconnects 219 may be vertically stacked, interleaved with one or more spacers 221, such as grooved ceramic tiles, to form an interconnect column 217. One or more interconnect columns 217 may be placed in a container or "retort" 223, which may be a container made of graphite or another high-temperature material that is adapted to contain vapors from the processed interconnects and prevent contamination of a processing chamber (e.g., a vacuum furnace) and any heating elements associated with the processing chamber. The container may include a gas distribution manifold 225 that is coupled to one or more gas sources (e.g., source 205) for providing a gas or gas mixture to the plurality of interconnects contained within the container. The container containing the plurality of interconnects 219 may be loaded into the processing chamber 203.

In various embodiments, nitrous oxide gas serves as a source for oxygen for the controlled oxidation of the interconnect(s). In embodiments, nitrous oxide may be the exclusive oxygen source for the oxidation of the interconnect(s). In other embodiments, one or more other sources of oxygen (e.g., $O_2$ gas, air, etc.) may be provided in addition to nitrous oxide. Preferably, nitrous oxide comprises at least about 10 volume percent, such as at least about 50 volume percent (e.g., 75-100%) of the oxygen containing component of the oxidizing gas and the other oxygen sources (e.g., oxygen gas, air, water vapor, etc.) comprise less than 90 volume percent, such as less than 50 volume percent (e.g., 0-25%) of the oxygen containing component of the oxidizing gas. The above ratios exclude any oxygen free gas (e.g., nitrogen gas, argon or other inert gas, etc.) component of the gas within processing chamber 203 and it should be understood that the oxygen free gas volume percent of the gas environment within chamber 203 may be larger or smaller than the oxygen-containing gas volume within the chamber 203.

In embodiments, the oxidation of the interconnects may be performed in a sub-atmospheric environment (e.g., 100-700 Torr). Performing the oxidation in a sub-atmospheric environment may improve uniformity in the simultaneous oxidation of a plurality of interconnects in the process chamber (e.g., vacuum furnace). Furthermore, the sub-atmospheric environment may enable a plurality of interconnects to be stacked in columns with at least a portion of the interconnects being in direct contact with one or more adjacent interconnects during the high-temperature oxidation process without becoming warped or otherwise damaged.

In embodiments, nitrous oxide gas may be used to oxidize one or more interconnects in an initial oxidation to form a thin oxide layer on exposed surfaces of the interconnect while inhibiting nitride formation. A secondary oxidation may then be performed to complete the oxidation process. The secondary oxidation may be performed under different conditions than the initial oxidation, and may or may not use nitrous oxide gas as a source of oxygen. For example, the initial oxidation may be performed at a temperature of 700-950° C. in the presence of a first oxidizing gas containing nitrous oxide (e.g., the nitrous oxide comprises at least about 10 volume percent, such as 50-100 volume percent, of the oxygen containing component of the first oxidizing gas) for between about 2 and 36 hours, such as about 24 hours. The secondary oxidation may be performed at a higher temperature of 850-1100° C. (e.g., 950-1100° C.) in the presence of a second oxidizing gas for 2-24 hours to at least partially fill pores in the interconnect. The second oxidizing gas may be different from the first oxidizing gas (e.g., nitrous oxide may comprise less than 10 volume percent, such as 0 volume percent, of the oxygen containing component of the second oxidizing gas). The second oxidizing gas may comprise one or more of air and/or $O_2$ gas as an oxygen source, for example. The thin oxide layer formed during the initial oxidation may prevent nitrides from forming on the interconnect during the secondary oxidation, even where the secondary oxidation is performed under conditions in which nitrides might otherwise form.

Figure 3A:
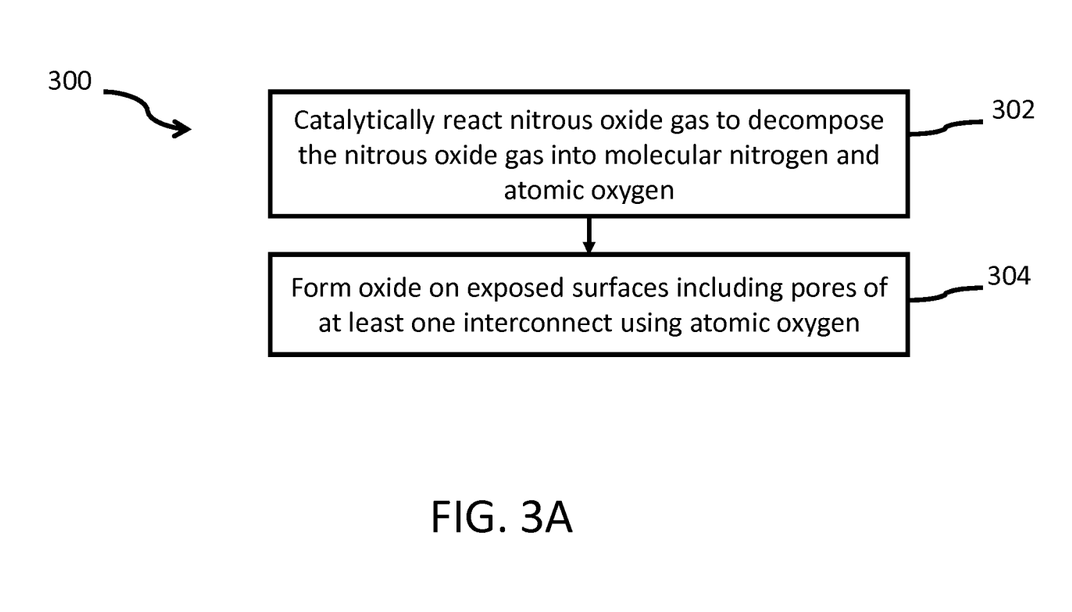
FIG. 3A is a process flow diagram illustrating an embodiment method for performing a controlled oxidation of an interconnect for a fuel cell stack using catalytically decomposed nitrous oxide as a source of atomic oxygen.

FIG. 3A is a process flow diagram illustrating an alternative embodiment method 300 for oxidizing an interconnect using nitrous oxide ($N_2O$) as a source gas for the oxide formation. In this embodiment, the nitrous oxide may be catalytically decomposed into molecular nitrogen and atomic oxygen, and the atomic oxygen may be used to form an oxide material on the interconnect. In step 302 of method 300, nitrous oxide gas is catalytically reacted to decompose at least a portion of the nitrous oxide into molecular nitrogen and atomic oxygen. The nitrous oxide gas may be catalytically reacted using a suitable catalyst material, such as one or more metals (e.g., nickel, gold, platinum, palladium, rhodium), metal oxides or mixed oxides, spinels, perovskites, zeolites, hydrotalcites, alumina, silica and/or zirconia supported systems, etc. Suitable catalyst materials are described in Kapteijn et al., "Heterogeneous Catalyst Decomposition of Nitrous Oxide," *Applied Catalysis B: Environmental* 9 (1996), pp. 25-64, which is incorporated herein by reference. In step 304, the catalytically decomposed atomic oxygen is used as a source of oxygen to form an oxide material on an interconnect for a fuel cell stack. An oxide material layer may be formed over exposed surfaces of the interconnect, including on the outer surfaces, pores and interconnected pores of the interconnect. The use of atomic oxygen, rather than molecular oxygen (e.g., $O_2$ gas) as is used in current processes, may improve the relative oxidation to nitridation rate, since atomic oxygen has greater activity than molecular oxygen. Thus, undesirable nitride formation on the interconnect may be inhibited.

In various embodiments, steps 302 and 304 of method 300 may be performed essentially simultaneously, meaning that nitrous oxide gas may be catalytically reacted in the presence of the interconnect, such as within a processing chamber (e.g., furnace) containing the interconnect and the catalyst at elevated temperature, and the atomic oxygen produced by the catalytic reaction may be used to form an oxide layer on the interconnect in situ. In other embodiments, step 302 may be performed to provide atomic oxygen at a first time and/or location (e.g., in a catalyst containing chamber), and the atomic oxygen may be introduced to an interconnect at a second time and/or location (e.g., in the furnace) to form an oxide material on the interconnect in step 304.

In embodiments, the oxide may be formed on the interconnect at elevated temperature, such as 250° or more (e.g., 250-700° C.), and preferably at a temperature less than 750° C. The oxidation may occur for a period between about 2 and 48 hours, such as 2-19 or 20-48 hours. In this temperature range, which may generally be less than the temperatures used for controlled air or $O_2$ oxidation of interconnects, the rate of nitridation of the interconnect is substantially decreased relative to the rate of oxide formation. Thus, the formation of nitrides on the interconnect may be further inhibited. Furthermore, by catalytically decomposing the nitrous oxide to produce atomic oxygen, the operating temperature may be lower than in the case of thermal decomposition of nitrous oxide, which may further reduce the operating cost of the processing chamber (e.g., furnace).

Figure 3B:
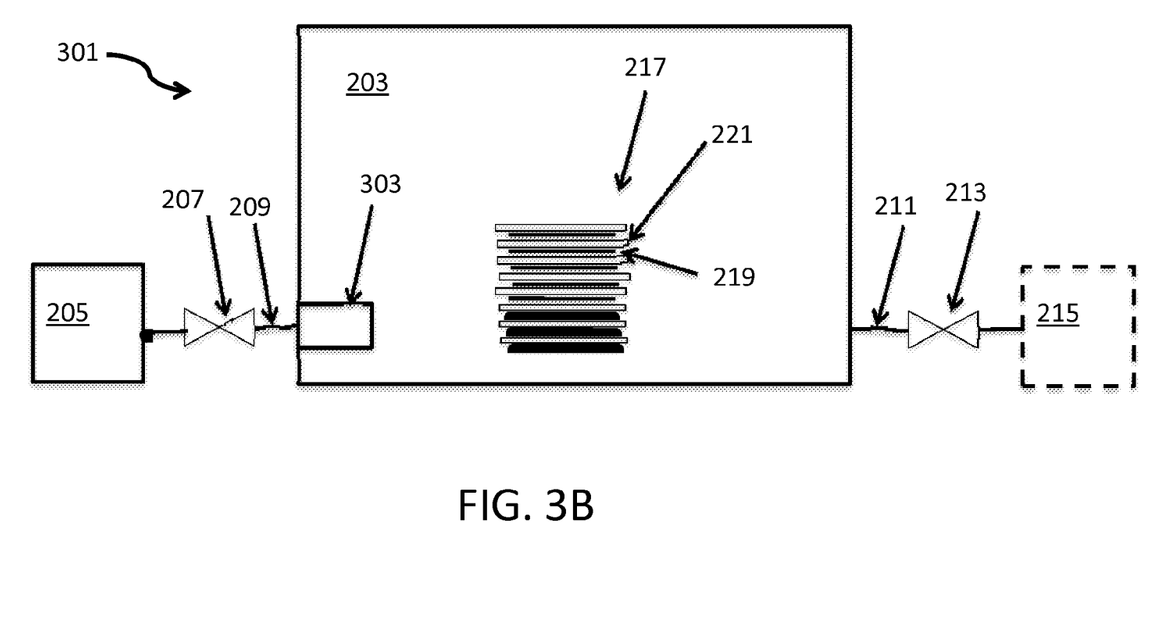
FIG. 3B is a schematic illustration of a system having a catalyst material for decomposing nitrous oxide for performing a controlled oxidation of an interconnect.

FIG. 3B schematically illustrates a further embodiment system 301 for oxidizing interconnects using nitrous oxide ($N_2O$) as a source gas for the oxide formation. This system 301 is similar to the system 201 of FIG. 2B. As shown in FIG. 3B, the system 301 may further include a catalyst member 303 of a suitable catalyst material in a fluid path between the source 205 of nitrous oxide gas and the interconnects 219 within the processing chamber 203. The catalyst member 303 may be, for example, a catalyst bed, a catalyst coated conduit, and/or a conduit containing one or more catalyst coated insert(s). Nitrous oxide gas from source 205 may flow over/through the catalyst member 303 to catalytically decompose the nitrous oxide into molecular nitrogen and atomic oxygen. The atomic oxygen may then flow over, under and/or through the interconnects 219 to form an oxide layer over exposed surfaces of the interconnect.

In the embodiment of FIG. 3B, the catalyst member 303 is shown within the processing chamber 203, which may enable the catalyst member 303 to be heated to a temperature suitable for promoting the catalytic decomposition of nitrous oxide into molecular nitrogen and atomic oxygen. In other embodiments, the catalyst member 303 may be located outside the processing chamber 203, and may be heated using a separate heater (not shown).

In embodiments, as an alternative or in addition to providing a catalyst member 303, a suitable catalyst material may be provided in one or more other locations within the system 301, such as coated on one or more interior surfaces of the chamber 203 or inlet conduit 209. The catalyst material may be provided on or in contact with the interconnects 219, such as on spacers 221.

Figure 4A:
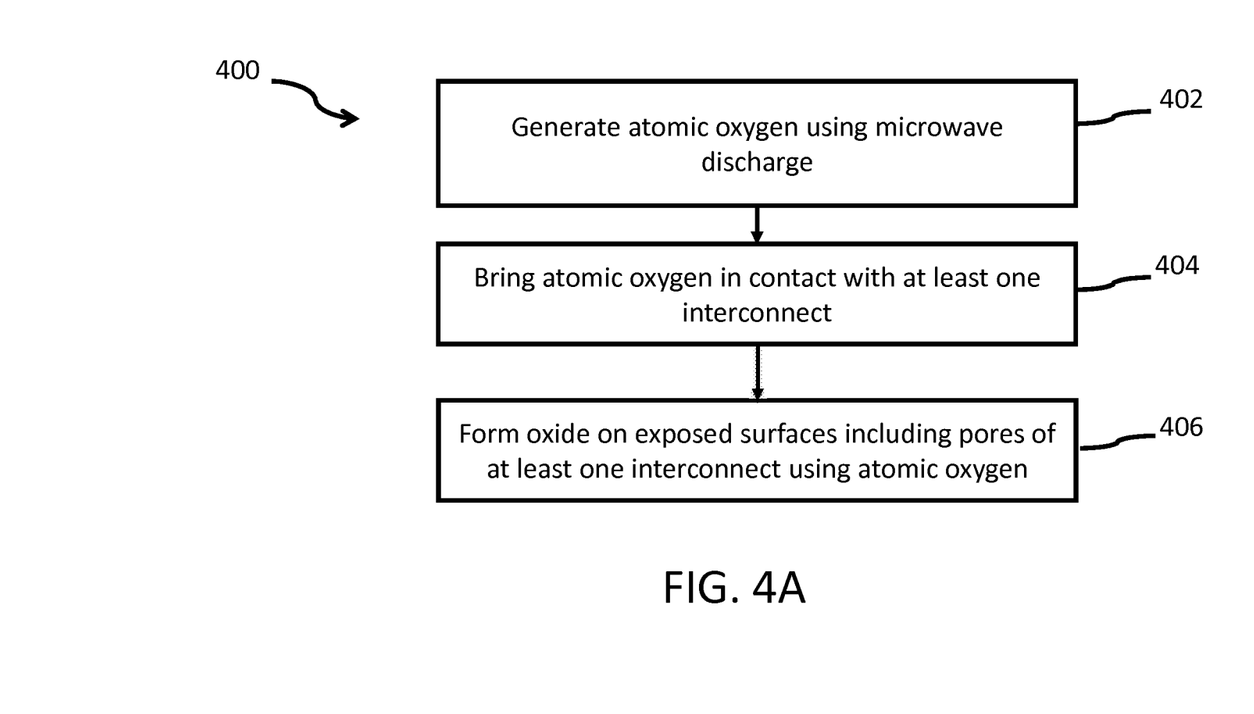
FIG. 4A is a process flow diagram illustrating an embodiment method for performing a controlled oxidation of an interconnect for a fuel cell stack using atomic oxygen generated by microwave discharge.

FIG. 4A is a process flow diagram illustrating a further embodiment method 400 for oxidizing an interconnect using atomic oxygen produced by microwave discharge as a source gas for the oxide formation. In step 402 of method 400, atomic oxygen is generated using microwave discharge. The microwave discharge may be, for example, a remote plasma generator configured to dissociate $N_2O$ to generate atomic oxygen. In step 404, the atomic oxygen is brought into contact with one or more interconnects. For example, the atomic oxygen may be flowed from a microwave discharge apparatus to one or more interconnects which may be within a processing chamber (e.g., furnace). In step 406, the atomic oxygen is used to form an oxide material layer over exposed surfaces of the interconnect, including on the outer surfaces, pores and interconnected pores of the interconnect. The use of atomic oxygen, rather than molecular oxygen (e.g., $O_2$ gas) as is used in current processes, may improve the relative oxidation to nitridation rate, since atomic oxygen has greater activity than molecular oxygen. Thus, undesirable nitride formation on the interconnect may be inhibited.

In various embodiments, steps 402 through 406 of method 400 may be performed essentially simultaneously, meaning that atomic oxygen may be formed by microwave discharge using a microwave discharge apparatus that is in fluid communication with and in close proximity to (e.g., within 10 meters, such as within 5 meters) a processing chamber (e.g., furnace) which may contain one or more interconnects at elevated temperature. The atomic oxygen produced by the microwave discharge apparatus may be used to form an oxide layer on the interconnect in situ. In other embodiments, step 402 may be performed to provide atomic oxygen at a first time and/or location, and the atomic oxygen may be introduced to an interconnect at a second time and/or location to form an oxide material on the interconnect in steps 404 and 406.

In embodiments, the oxide may be formed on the interconnect at elevated temperature, such as 250° or more (e.g., 250-700° C.), and preferably less than 750° C. The oxidation may occur for a period of about 2 to about 48 hours, such as 2-19 hours or 20-48 hours. In this temperature range, which may generally be less than the temperatures currently used for controlled oxidation of interconnects, the rate of nitridation of the interconnect is substantially decreased relative to the rate of oxide formation. Thus, the formation of nitrides on the interconnect may be further inhibited. Furthermore, by generating the atomic oxygen using microwave discharge, the operating temperature may be lower than in the case of thermal decomposition of nitrous oxide, which may further reduce the operating cost of the processing chamber (e.g., furnace).

Figure 4B:
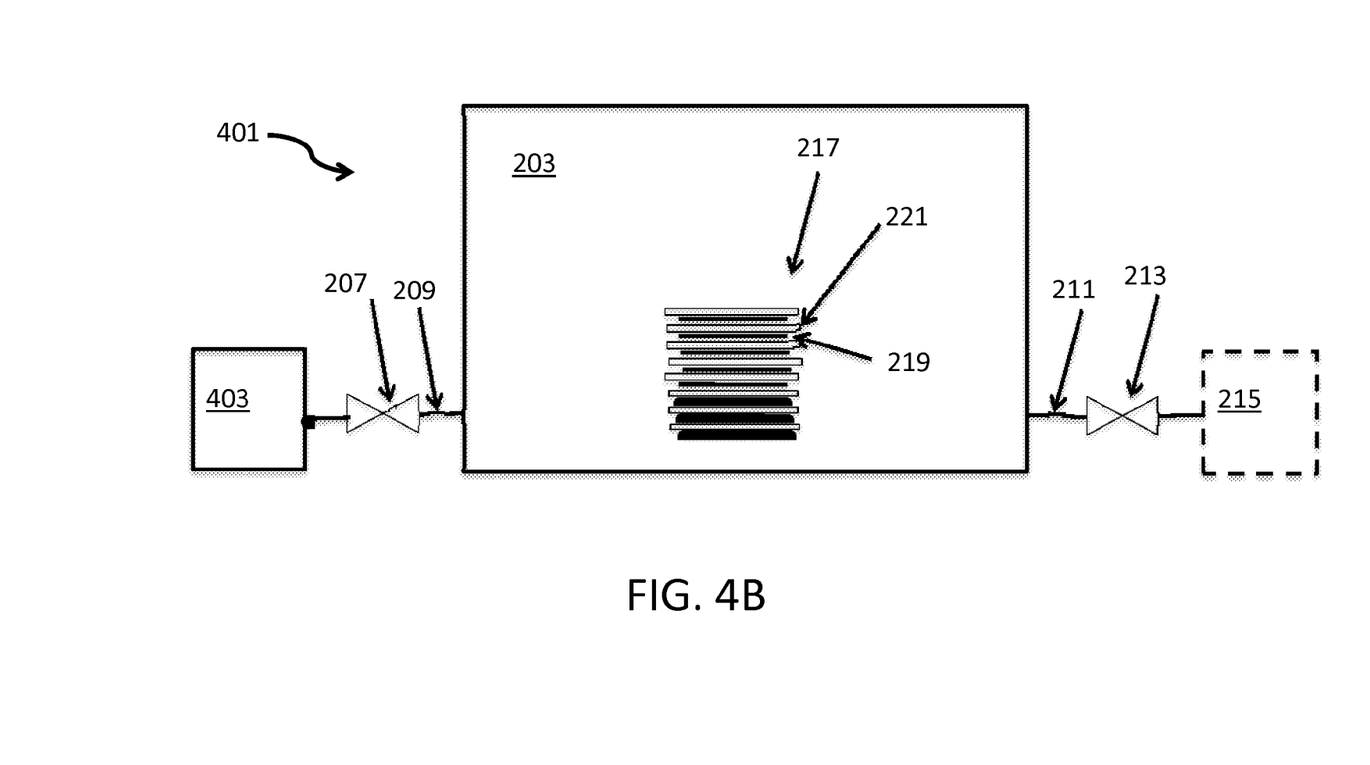
FIG. 4B is a schematic illustration of a system having a microwave discharge apparatus for generating atomic oxygen for performing a controlled oxidation of an interconnect.

FIG. 4B schematically illustrates a further embodiment system 401 for oxidizing interconnects using atomic oxygen as a source gas for the oxide formation. This system 401 is similar to systems 201 and 301 of FIGS. 2B and 3B, respectively. As shown in FIG. 4B, the system 401 may further include a microwave discharge apparatus 403 in fluid communication with the interior of the processing chamber 203. Atomic oxygen generated by microwave discharge apparatus 403 may selectively flow into the processing chamber 203 through inlet conduit 205 and then flow over, under and/or through the interconnects 219 to form an oxide layer over exposed surfaces of the interconnect.

Figure 5:
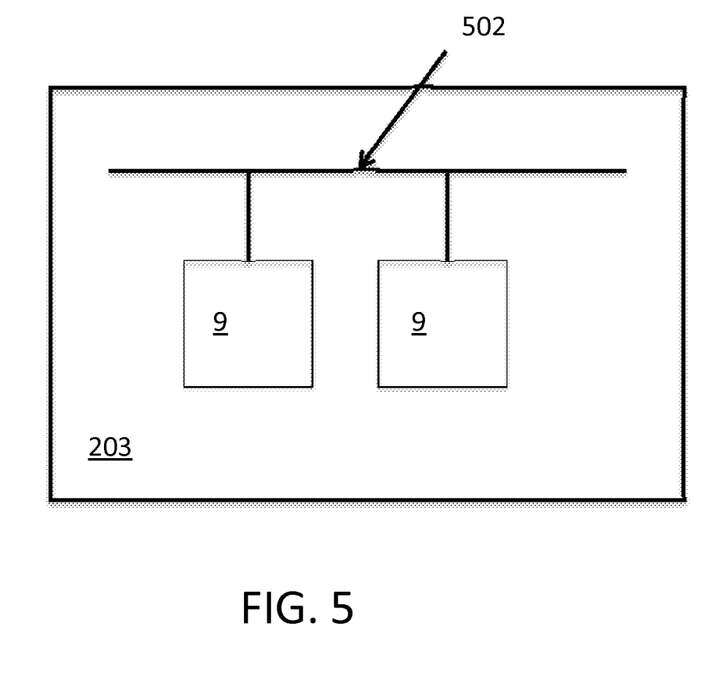
FIG. 5 schematically illustrates a support apparatus for hanging interconnects within a processing chamber for oxidizing the interconnects.

While various embodiments of an oxidation method for interconnects have been described in which a plurality of interconnects are vertically stacked in columns, alternative arrangements of the interconnects during the oxidation process may also be utilized. FIG. 5 illustrates an embodiment in which a plurality of interconnects 9 are hung by their edges by a suitable support apparatus 502, which may be similar to a clothes line for drying clothes, within the processing chamber 203.

Figure 6A:
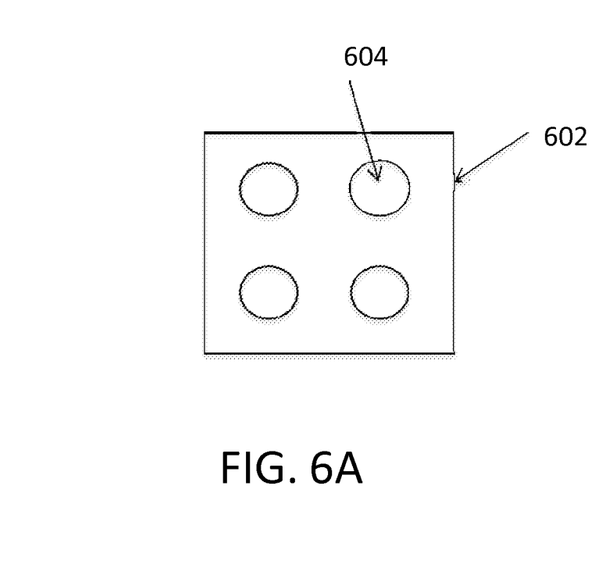
FIG. 6A is a top view of a ceramic tile spacer having openings provided through the spacer to allow fresh air to interact with an interconnect adjacent the spacer.
Figure 6B:
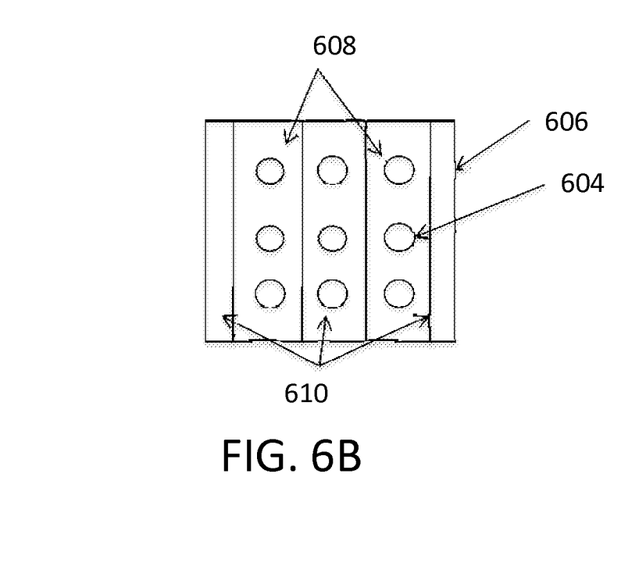
FIG. 6B is a top view of a ceramic tile spacer having ridges defining grooves between the ridges to allow fresh air to flow and interact with an interconnect adjacent the spacer.
Figure 6C:
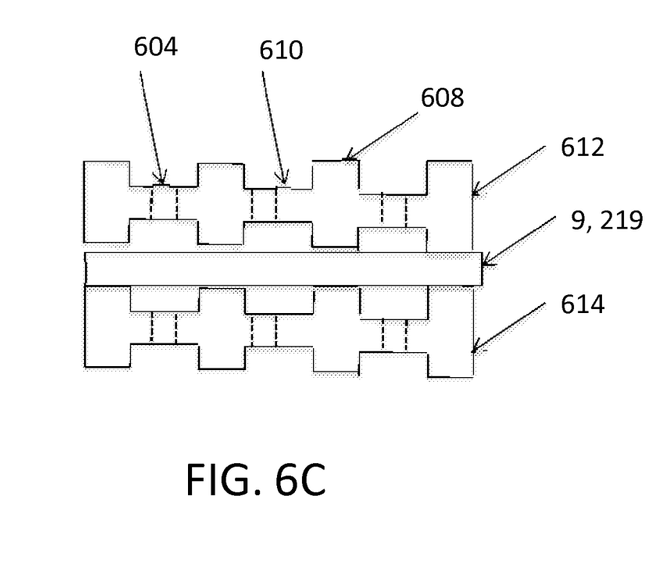
FIG. 6C is a side view of an interconnect positioned between a pair of ceramic tile spacers having ridges defining grooves and openings to allow fresh air to flow and interact with the interconnect.

Instead of hanging the interconnects, the interconnects may be provided with access to moving gas through other means, such as by providing the interconnects on porous or grooved supports. For example, a plurality of interconnects 219 may be stacked to form one or more columns 217 shown in FIG. 2B. The interconnects in a column may be interleaved with spacers 221, such as ceramic tiles, which may be formed with openings or grooves to allow fresh air to flow and interact with the interconnects. FIG. 6A is a top view of a ceramic tile spacer 602 having openings 604 formed through the spacer 602 to allow fresh air to interact with the interconnects. FIG. 6B is a top view of a ceramic tile spacer 606 having ridges 608 defining grooves 610 between the ridges 608 to allow fresh air to flow and interact with the interconnects. The spacer 606 may optionally also include openings 604 through the spacer 606. FIG. 6C is a side view of an interconnect 9, 219 positioned between a pair of ceramic tile spacers 612, 614. Each of the spacers 612, 614 include ridges 608 and grooves 610 in addition to openings 604 to permit fresh air to interact with the interconnect 9, 219.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for oxidizing a solid oxide fuel cell interconnect for a solid oxide fuel cell stack, comprising:
generating atomic oxygen; and
forming an oxide layer on exposed surfaces of the solid oxide fuel cell interconnect using the atomic oxygen, wherein at least one of:
(i) generating atomic oxygen comprises heating nitrous oxide gas to thermally decompose the nitrous oxide gas into molecular nitrogen and atomic oxygen;
(ii) generating atomic oxygen comprises catalytically reacting nitrous oxide gas to decompose the nitrous oxide gas into molecular nitrogen and atomic oxygen; and
(iii) the atomic oxygen is generated using a microwave discharge.

2. The method of claim 1, wherein generating atomic oxygen comprises:
heating nitrous oxide gas to thermally decompose the nitrous oxide gas into molecular nitrogen and atomic oxygen.

3. The method of claim 2, further comprising:
introducing the nitrous oxide gas into a processing chamber containing the solid oxide fuel cell interconnect, the processing chamber being heated to a temperature sufficient to thermally decompose the nitrous oxide gas and to form the oxide layer on exposed surfaces of the solid oxide fuel cell interconnect.

4. The method of claim 2, wherein the oxide layer is formed at a temperature of 700-950° C.

5. The method of claim 3, wherein the processing chamber comprises a vacuum furnace.

6. The method of claim 1, wherein generating atomic oxygen comprises:
catalytically reacting nitrous oxide gas to decompose the nitrous oxide gas into molecular nitrogen and atomic oxygen.

7. The method of claim 6, further comprising:
flowing the nitrous oxide gas over a catalyst material to promote catalytic decomposition of the nitrous oxide gas into the molecular nitrogen and atomic oxygen; and
flowing the atomic oxygen over the exposed surfaces the solid oxide fuel cell interconnect to form the oxide layer.

8. The method of claim 6, wherein the oxide layer is formed at a temperature of 250-700° C.

9. The method of claim 1, wherein the atomic oxygen is generated using a microwave discharge.

10. The method of claim 9, wherein the atomic oxygen is generated using a microwave discharge apparatus in fluid communication with the interior of a processing chamber containing the solid oxide fuel cell interconnect, the method further comprising:
directing atomic oxygen from the microwave discharge apparatus into the processing chamber and into contact with the solid oxide fuel cell interconnect.

11. The method of claim 10, wherein the oxide layer is formed at a temperature of 250-700° C.

12. The method of claim 1, wherein the oxide layer is formed at a temperature of less than 950° C.

13. A method for oxidizing a solid oxide fuel cell interconnect for a solid oxide fuel cell stack, comprising:
generating atomic oxygen;
forming an oxide layer on exposed surfaces of the solid oxide fuel cell interconnect using the atomic oxygen; and
incorporating the solid oxide fuel cell interconnect into a solid oxide fuel cell stack following the oxidation.

14. The method of claim 13, wherein the solid oxide fuel cell interconnect comprises an end plate that is incorporated into the solid oxide fuel cell stack at an end of the solid oxide fuel cell stack.

15. The method of claim 1, wherein forming an oxide layer on exposed surfaces comprises forming the oxide layer on exposed surfaces of pores of the solid oxide fuel cell interconnect to at least partially fill the pores with oxide material.

16. The method of claim 1, wherein a plurality of solid oxide fuel cell interconnects are oxidized and the fuel cell stack is a solid oxide fuel cell stack.

17. The method of claim 16, further comprising:
stacking the plurality of solid oxide fuel cell interconnects into at least one column;
positioning the at least one column into a container; and
providing atomic oxygen into the interior of the container to oxidize the solid oxide fuel cell interconnects.

18. The method of claim 1, further comprising incorporating the solid oxide fuel cell interconnect into the solid oxide fuel cell stack following the oxidation, wherein the solid oxide fuel cell interconnect comprises a chromium and 4-6 volume % iron gas separator plate with ribs and forming the oxide layer comprises oxidizing the solid oxide fuel cell interconnect to form an oxide of at least one of chromium or iron.

19. A method for oxidizing a plurality of solid oxide fuel cell interconnects for a solid oxide fuel cell stack, comprising:
stacking the plurality of solid oxide fuel cell interconnects into at least one column;
positioning the at least one column into a container;
loading the container into a vacuum furnace;
generating atomic oxygen; and
providing the atomic oxygen into the interior of the container to oxidize the solid oxide fuel cell interconnects by forming an oxide layer on exposed surfaces of the solid oxide fuel cell interconnects using the atomic oxygen.

20. The method of claim 16, further comprising:
hanging the solid oxide fuel cell interconnects in a processing chamber such that the solid oxide fuel cell interconnects are exposed to the atomic oxygen.

21. The method of claim 19, further comprising incorporating the solid oxide fuel cell interconnect into the solid oxide fuel cell stack following the oxidation, wherein the solid oxide fuel cell interconnect comprises a chromium and 4-6 volume % iron gas separator plate with ribs and forming the oxide layer comprises oxidizing the solid oxide fuel cell interconnect to form an oxide of at least one of chromium or iron.

22. A method for oxidizing a solid oxide fuel cell interconnect for a solid oxide fuel cell stack, comprising:
generating atomic oxygen; and
forming an oxide layer on exposed surfaces of the solid oxide fuel cell interconnect using the atomic oxygen, wherein at least one of:
(i) the solid oxide fuel cell interconnect is formed by powder metallurgy and comprises chromium and 4-6 volume % of iron, and
(ii) forming an oxide layer on exposed surfaces comprises forming the oxide layer on exposed surfaces of pores of the solid oxide fuel cell interconnect to at least partially fill the pores with oxide material.

23. The method of claim 22, further comprising incorporating the solid oxide fuel cell interconnect into the solid oxide fuel cell stack following the oxidation, wherein the solid oxide fuel cell interconnect comprises the chromium and 4-6 volume % iron gas separator plate with ribs and forming the oxide layer comprises oxidizing the solid oxide fuel cell interconnect to form an oxide of at least one of chromium or iron.

24. The method of claim 23, wherein the solid oxide fuel cell interconnect is formed by powder metallurgy and comprises chromium and 4-6 volume % of iron, and forming the oxide layer on exposed surfaces comprises forming the oxide layer on exposed surfaces of pores of the solid oxide fuel cell interconnect to at least partially fill the pores with the chromium oxide or iron oxide material.

25. The method of claim 13, wherein the solid oxide fuel cell interconnect is incorporated into the solid oxide fuel cell stack between two solid oxide fuel cells and wherein the solid oxide fuel cell interconnect is a as separator plate with ribs.

26. The method of claim 13, wherein the solid oxide fuel cell interconnect comprises a chromium and 4-6 volume % iron gas separator plate with ribs and forming the oxide layer comprises oxidizing the solid oxide fuel cell interconnect to form an oxide of at least one of chromium or iron.

\* \* \* \* \*